United States Patent [19]

Becker

[11] 4,436,250

[45] Mar. 13, 1984

[54] DRIVE UNIT FOR A TRANSPORT CABLE

[75] Inventor: Herbert Becker, Coburg, Fed. Rep. of Germany

[73] Assignee: Metallwerk Max Brose GmbH & Co., Coburg, Fed. Rep. of Germany

[21] Appl. No.: 286,560

[22] Filed: Jul. 24, 1981

[30] Foreign Application Priority Data

Aug. 20, 1980 [DE] Fed. Rep. of Germany ... 8022252[U]

[51] Int. Cl.³ ..................... B65H 75/44; B65H 75/48
[52] U.S. Cl. ................................ 242/54 R; 242/56 A
[58] Field of Search .......................... 242/54 A, 54 R

[56] References Cited

U.S. PATENT DOCUMENTS 2,949,608 8/1960 Fischer ........................... 242/54 A
4,181,268 1/1980 Carolus et al. ................... 242/54 A Primary Examiner—Stuart S. Levy
Assistant Examiner—Lloyd D. Doigan
Attorney, Agent, or Firm—Toren, McGeady and Stanger

[57] ABSTRACT

A drive unit for winding and unwinding a transport cable for a safety belt includes a motor driven take-up roll positioned within a housing and rotatable about a winding axis. The take-up roll has a radially outwardly facing surface encircling the winding axis. A casing encloses the take-up roll and has a radially inwardly facing surface spaced outwardly from the radially outwardly facing surface. When the cable is wound into the housing it winds onto the radially outwardly facing surface and when it is unwound it contacts the radially inwardly facing surface on the casing. The radially inwardly facing surface is frusto-conical in the direction of the winding axis with the larger diameter portion of the surface located closer to the opening from the housing through which the cable passes. Adjacent its larger diameter end, the radially inwardly facing surface has a circumferentially and radially extending step for preventing bending or kinking of the cable.

14 Claims, 4 Drawing Figures

DRIVE UNIT FOR A TRANSPORT CABLE

SUMMARY OF THE INVENTION

The present invention is directed to a drive unit for winding and unwinding a transport cable and, in particular, it concerns a transport cable for use with a safety belt in a motor vehicle. The drive unit includes a motor-driven take-up roll located within a housing so that it can be rotated about a winding axis. A casing encloses the take-up roll and is spaced radially outwardly from it. One end of the transport cable is fixed to a cable attachment on the take-up roll. The cable is wound and unwound through an opening in the housing. As the cable is wound onto the take-up roll it rests against an outer circumferential surface of the roll and when the cable is unwound out of the housing it contacts the inner circumferential surface on the casing located opposite the outer circumferential surface. The radially inwardly facing circumferential surface is frusto-conically shaped with its smaller diameter end located opposite the location of the attachment of the cable to the take-up roll and the larger diameter end of the surface merges into a cable guide surface formed on the housing.

In such a drive unit, the transport cable functions as a tension cable when it is being wound onto the take-up roll and as a pressure cable when it is being unwound. As the cable moves in and out of the housing, various forces act on it, such as the friction force developed in a guide for the transport cable outside of the drive unit. As the cable is wound onto the take-up roll, the opposing forces acting on it tend to wind the cable especially tautly about the radially outwardly facing circumferential surface of the take-up roll. When the cable is being unwound, however, the opposing forces acting on it tend to cause problems. Such transport cables have both tensile and compressive strength (plastic-encased steel cable), but they are relatively thin and therefore sensitive to bending with the possibility of developing kinks. Once a transport cable develops a kink it is unusable and must be replaced. To prevent any bending or kinking, the transport cable is fitted into the transport guide for its entire length outside of the drive unit. Within the drive unit, however, the transport cable cannot be guided in the same manner. As the cable is unwound, the individual loops of the cable contact the radially inwardly facing circumferential surface of the casing. When the unwinding operation is commenced, the loops of cable rest closely adjacent to one another along the radially inwardly facing surface and the danger of developing a kink is very slight, since there is very little play in the cable as it moves along the radially inwardly facing surface toward the opening from the housing. As the unwinding of the cable continues, the amount of play in the cable increases. The danger that the cable may develop a kink as it rides over the radially inwardly facing surface decreases in the direction of the cable attachment, since the friction forces acting between the cable and the radially inwardly facing surface compensate to an increasing degree for the opposing force acting against the movement of the cable out of the housing. The most dangerous location for the development of a kink in the cable is in that region where the cable is displaced out of the housing opening. Due to the frusto-conical shape of the radially inwardly facing surface, the cable loops move toward the cable guide surface on the housing. If several cable loops remain within the casing, the danger of kinking is relatively slight, since the cable within the casing is pressed by the number of loops against the cable guide surface. Toward the end of the unwinding operation, when only one or less than one cable loop remains, the ability of the cable to oppose a bending or kinking movement is reduced and there is an increased danger that the cable may be kinked. If additional forces oppose the movement of the cable out of the housing, then a bending or kinking of the cable can occur. Such opposing forces are developed in a device for attaching a safety belt in a motor vehicle, for instance when the safety belt has been released and the belt user is free to exit from the vehicle but holds onto the belt to facilitate his exit.

The primary object of the present invention is to provide a drive unit of the type mentioned above where the danger of bending or kinking the transport cable as it is unwound is reduced.

In accordance with the present invention, the radially inwardly facing surface of the casing is provided in the circumferential direction in the region close to its end or edge of larger diameter with a surface part extending transversely of the axial direction of the winding axis with the surface part extending radially inwardly relative to the larger diameter surface. Due to this surface part, it is provided that the axial movement of the section of the transport cable exposed to the possibility of bending or kinking is biased toward the cable guide surface, either due to direct contact with the surface part or indirectly because a cable loop following the section exposed to bending is supported against the surface part.

One feature of the invention is the provision of a bevelled surface on the surface part with the bevel extending in the direction toward the smaller diameter end of the frusto-conical radially inwardly facing surface. With such an arrangement, during the unwinding operation, the cable loops can move without any significant interference toward the cable guide surface on the housing.

In one embodiment of the invention the surface part is formed as a circumferentially extending step with the step surface facing toward the larger diameter end of the frusto-conical radially inwardly facing surface of the casing. Such a step or shoulder can be formed at low costs and offers effective protection against bending or kinking of the cable, because it extends uninterruptedly in the circumferential direction.

It has been determined that a relatively narrow step is sufficient, such as a step which is 0.1 to 0.3 times the cable diameter and preferably 0.15 to 0.2 times, or for the best results is 0.175 times the cable diameter.

It has been found to be advantageous if the axial dimension between the surface part or step and the larger diameter end of the radially inwardly facing surface of the casing is in the range of 1 to 4 times the cable diameter. Further, it is preferable if the axial dimension is 1.5 to 3 times the cable diameter, however, the most advantageous dimension is about 1.5 times the cable diameter.

It is suggested that the radially inwardly facing surface of the casing be frusto-conically shaped from the surface part or step toward the smaller diameter end of the surface with the remaining surface extending from the step to the larger diameter end being cylindrical. Accordingly, the step can be produced in one operation in the cylindrical surface, such as by a turning operation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
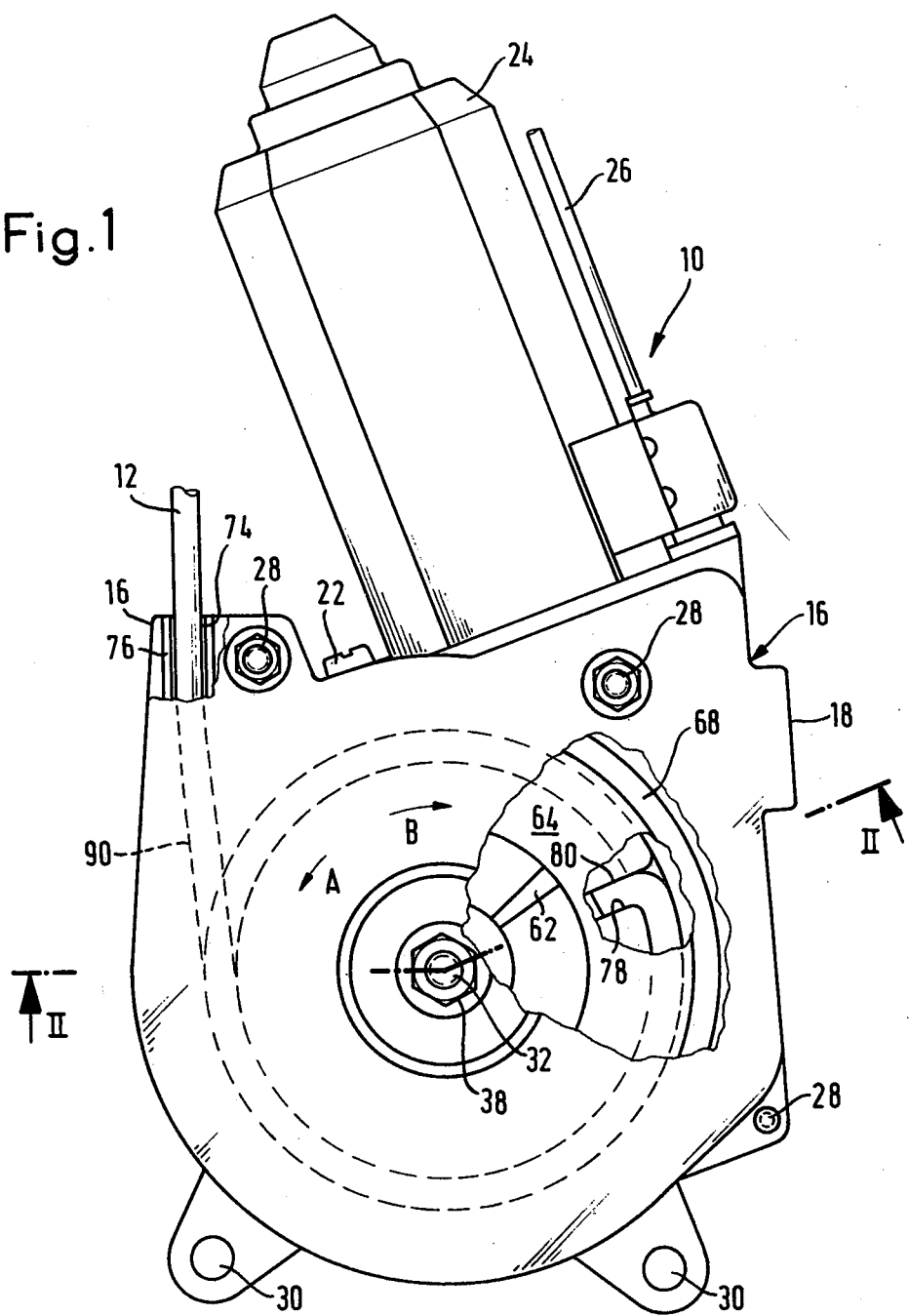
FIG. 1 is a bottom view, partially broken away, of a drive unit embodying the present invention.
Figure 2:
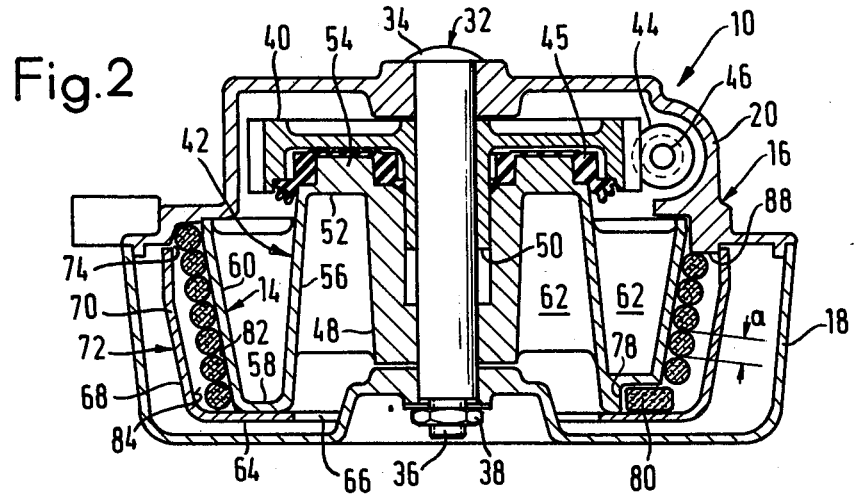
FIG. 2 is a sectional view taken along the line II—II in FIG. 1.
Figure 3:
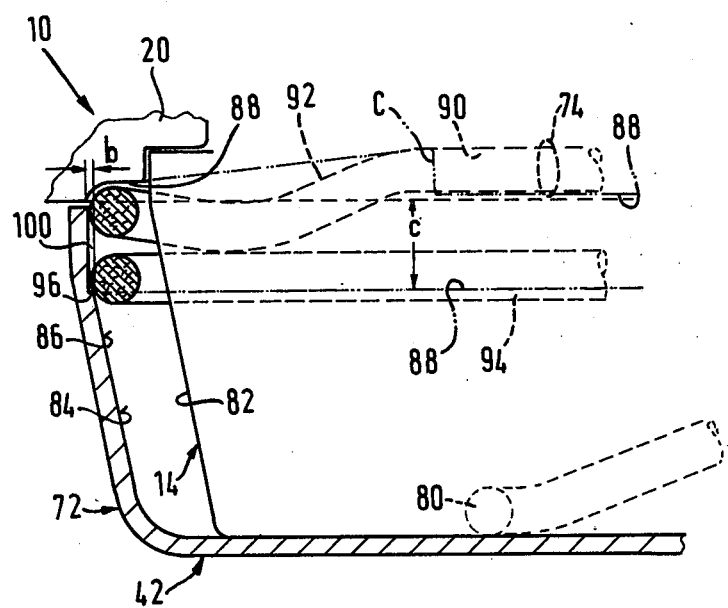
FIG. 3 is an enlarged detailed sectional view of a portion of the unit shown in FIG. 2.

In FIGS. 1, 2 and 3, a drive unit 10 is illustrated which drives a transport cable 12, only a portion of which is shown in FIG. 1. The cable 12 is connected to a device, not shown, for operating a motor vehicle safety belt. In such a device for operating a safety belt, the belt is moved into the engaged or locked condition or the released condition by a motor. The end of the safety belt or a belt loop is attached to the free end of the transport cable 12, however, the free end is not illustrated in FIG. 1. When the safety belt is in the locked or engaged position, the transport cable is wound onto the take-up roll 14, note FIGS. 2 and 3, in releasing the safety belt, the transport cable is unwound from the motor driven take-up roll 14 with the aid of a wind-off drum 72 rigidly connected to the take-up roll and surrounding the roll with the drum being spaced radially outwardly from the roll, as will be described in detail below.

Drive unit 10 includes a closed housing 16 formed by a housing base 18 and a housing cover 20. An electro-motor 24 is flanged onto the housing 16 and is secured by screws 22, note FIG. 1. An electrical supply line 26, shown broken off, is connected to the electro-motor 24. Housing base 18 serves as a protective cover preventing the penetration of dirt or moisture into the housing. In a simpler but not illustrated embodiment, the housing base 18 could be omitted so that the wind-off drum 72 forms the base of the housing 16.

Housing base 18 is fixed to the housing cover 20 by screws 28. Holes 30 to receive screws are located in the housing cover 20 for attaching the drive unit to a vehicle body.

The inner assembly of the drive unit 10 is illustrated in FIG. 2. A bearing shaft 32 is secured at its upper end to the housing cover 20, the upper end of the bearing shaft has an enlarged head 34 bearing against the outside surface of the housing cover. The lower end of the bearing shaft has a thread 36 on which a fastening nut 38 is screwed for securing the shaft to the housing 18. A gear wheel 40 and a two-part take-up part 42 are rotatable mounted on the bearing shaft 32. Gear wheel 40 is driven by a worm gear 44, note FIG. 2, with the worm gear fixed to the motor shaft 46 of the electro-motor 24.

The rotation of the gear wheel 40 about the axis of the bearing shaft 24 is transmitted via an elastic clutch or coupling 45 formed of rubber or plastic, to the take-up part 42. Take-up part 42 includes a bearing collar 48 with an interior bore of different diameter sections with the bearing collar being rotatably mounted at its lower end as viewed in FIG. 2 on the bearing shaft 32. The increased diameter section of the bearing collar bore above the location where it is mounted on the bearing shaft, receives a bearing neck or sleeve 50 of the worm gear 40. This arrangement affords a mechanically stable bearing for the take-up part 42. At the upper end of the ring collar 48, a wall 52 extends radially outwardly from and transversely of the axis of the bearing shaft and this wall has upwardly projecting protuberances 54 which engage in corresponding recesses in the superposed elastic clutch 45. A frusto-conically shaped wall 56 extends downwardly from the radially outer edge of the wall 52 with the wall 56 increasing in diameter in the downward direction. Another wall 58, extending transversely of the axis of the bearing shaft 32, extends radially outwardly from the lower end of the wall 56 and a frusto-conically shaped wall 60 extends upwardly from the radially outer edge of wall 58. The entire arrangement of bearing collar 48, walls 52, 56, 58 and 60, which form the take-up roll 14, is stiffened by radially extending walls 62.

Below the transversely extending wall 58 is another similarly extending wall 64 which is attached to wall 58 by spot welding. Wall 64 is an annular member forming a central circular opening 66 disposed about the axis of the bearing shaft 32 so that the wall 64 is maintained at a distance from the housing base 18 to prevent any interference in the rotation of the take-up part 42. At the radially outer edge of the wall 64, a wall 68 widens in the upward direction and the lower section of the wall 68 is frusto-conical while its upper section 70 is cylindrical. Walls 64 and 68 form the wind-off drum 72 which provides the roll casing for the take-up roll 14.

The transport cable 12 moves into and out of the housing 16 through an opening 74. A guide 76 for the cable 12 is provided through the opening 74, note FIG. 1. Within the housing 16, cable 12 has an end 80 secured to a cable attachment 78 located at the lower end of the take-up roll 14, as viewed in FIG. 2. Cable attachment 78 is in the form of a bore adapted to receive the diameter of the cable 12.

To wind up the cable 12, (when the safety belt is in the engaged or locked position), the take-up part 42 is turned by electro-motor 24 via the worm gear 44 and the gear wheel 40 in the direction A as shown in FIG. 1. Because of the tension exerted on the cable 12, the cable bears against the radially outwardly facing circumferential surface of wall 60, that is the radially outwardly facing surface of the take-up roll 14. Due to the frusto-conical configuration of the radially outer surface of the take-up part 42, the first loop formed by the cable rests against the lower edge of the radially outwardly facing surface 82 and contacts the upper surface of the transversely extending wall 64, note FIG. 2. After this first loop is formed a series of loops extend around the surface 82 resting one against the other until the cable is wound in the condition shown in FIG. 2 with the take-up roll 14 covered with the loops and corresponding to the engaged position of the safety belt.

To release or remove the safety belt, the transport cable mut be unwound from the take-up roll 14. The problem occurs at this point that while the transport cable 12, as a plastic-encased steel cable, has both tensile and compressive strength, it is not resistant to bending and it may be easily bent or kinked if it is not properly guided. Exteriorly of the housing 16, cable 12 extends through a guide, not shown, which completely encloses the cable in a nearly play-free manner. Within the housing, between the radially outwardly facing surface of the take-up roll 14 and the radially inwardly facing surface of the wind-off drum 72, the cable cannot be guided in a play-free manner.

During the unwinding of the cable (arrow direction B in FIG. 1), the loops of the cable 12 move radially outwardly against the radially inwardly facing circumferentially extending surface 84 of the upwardly extending wall 68 which forms a part of the wind-off drum 72, because during such unwinding movement an opposing force acts on the cable opposite to the movement in the direction B. This opposing force can be caused by the friction of the cable 12 inside the guide exterior of the housing 16 or it can develop when the person wearing the belt in the released state holds on to the belt or on to its loop. Because of the frusto-conical surface 86 of the radially inwardly facing circumferentially extending surface 84, note FIG. 3, the cable loops tend to move upwardly with the uppermost loop contacting a cable guide surface 88 formed in the downwardly facing surface of the housing cover 20. The arrangement of the cable guide surface can be noted in FIG. 2 where the surface 88 extends substantially along a thread-like surface with the pitch corresponding to the diameter a of cable 12. From the uppermost surface of the cable guide surface 88, as shown in the left-hand part of FIG. 2, the cable extends tangentially outwardly from the take-up part 42 through a guide duct 90, note FIG. 1, and out of the housing through the opening 74.

Figure 4:
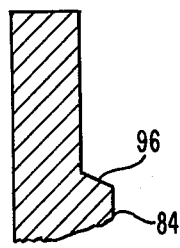
FIG. 4 is an enlarged detail view of a part of FIG. 3.

In FIG. 3, a dot-dash line indicates the upward slope of the cable guide surface 88 in the housing cover 20. The device shown in FIG. 3 has been rotated relative to the section of the device illustrated in FIG. 2. Location C indicates the position at which the cable duct 90 extends outwardly from the cable guide surface 88. The danger of the cable bending or kinking while it is wound on the take-up part 42 decreases toward the attached end 80 of the cable, since the frictional forces acting between the cable and the radially inwardly facing circumferential extending surface 88 compensate for the opposing force mentioned above. The greatest danger of bending or kinking occurs in the section 92 of the cable immediately preceding the location C and the section 92 can comprise up to one and one-half loops of the cable. When the unwinding of the cable commences, the danger of bending or kinking is slight, since the cable loops forced outwardly against the frusto-conical surface 86 press the preceding cable loops upwardly against the cable guide surface 88. When the take-up part 42 has been unwound down to about two or less cable loops, the action of forcing the cable loops against the frusto-conical surface 86 no longer occurs. As displayed in FIG. 3, section 92 of the cable 12 is in danger of being kinked as it moves in the axial direction of the bearing shaft 32 along the radially inwardly facing circumferentially extending surface 84 so that it may be caused to deflect or bend in the manner shown in FIG. 3. As illustrated, section 92 abuts against the immediately following loop 94 which tends to push the following loop downwardly causing further bending in the section 92 as long as the loop 94 is not prevented from such downward movement. The position of loop 94 is maintained by a circumferentially extending step 96 formed in the radially inwardly facing surface 84. This step 96 extends in the circumferential direction around the radially inwardly facing surface 84 and the edge 88 of the step is shown by a dot-dash line in FIG. 3 note the enlarged view of step 96 shown in FIG. 4.

Step 96 is located at the upper end of the frusto-conical surface 86 of the radially inwardly facing surface 84 so that it provides a radially outwardly extending step or shoulder from the frusto-conical surface extending into the cylindrical surface 100. In other words, the step 96 is located at the intersection of the frusto-conical surface 86 and the cylindrical surface 100. The radial dimension of the step 96 is about 0.6 to 0.8 mm. The dimension c between the step 96 and the upper edge of the radially inwardly facing circumferentially extending surface 84, measured in the axial direction of the bearing shaft 32, is about 7 mm. The diameter a of the cable 12 is 4 mm.

The step 96, dimensioned as described above, is sufficiently large to prevent downward movement of the cable 12 beyond the step 96. This occurs because the opposing force acting on the cable section 92 acts mainly radially outwardly against the radially inwardly facing surface 84. Since the step surface in FIG. 3 faces upwardly, the step 96 offers practically no resistance to the desired upward movement of the cable loops.

With this arrangement it is possible to prevent in a reliable manner any bending or kinking of the cable, even though strong opposing forces are exerted on the cable when it is wound down to about one and one-half loops, which takes place when the device for operating the safety belt is almost in the engaged position and the person operating the belt holds on to it in order to facilitate exiting from the vehicle.

While specific embodiments of the invention have been shown and described in detail to illustrate the application of the inventive principles, it will be understood that the invention may be embodied otherwise without departing from such principles.

I claim:

1. Drive unit for winding and unwinding a transport cable, such as for use with a safety belt employed in a motor vehicle in moving the safety belt between the engaged and released conditions, comprising a housing, a motor-driven take-up roll mounted within said housing, said take-up roll having an annular surface on which said transport cable can be wound around a winding axis with said annular surface encircling and facing radially outwardly from the winding axis so that the annular surface extends circumferentially and in the axial direction of the winding axis, a casing spaced radially outwardly from and enclosing said annular surface and having a radially inwardly circumferentially extending surface facing toward said radially outwardly facing annular surface, said radially outwardly facing annular surface having a first end and a second end spaced apart in the axial direction of said winding axis, said transport cable is secured at the first end of said radially outwardly facing surface to said take-up roll, said housing having an opening through which said transport cable extends out of said housing with said opening spaced in the axial direction of the winding axis from the first end of said radially outwardly facing annular surface and being closer to the second end thereof, said transport cable contacts said radially outwardly facing annular surface of said take-up roll when said cable is wound into said housing and contacts said radially inwardly facing surface of said casing when said cable in unwound out of said housing, said radially inwardly facing surface is frusto-conical for at least a portion of its dimension extending in the axial direction of the winding axis with the smaller diameter end of said radially inwardly facing surface located opposite the first end of said radially outwardly facing annular surface and the larger diameter end spaced axially therefrom toward the second end of said annular surface, said housing having a cable guide surface thereon facing into the space between said radially inwardly and radially outwardly facing surfaces, said radially inwardly facing surface having the larger diameter end thereof merging into said cable guide surface, said radially inwardly facing surface having a surface part adjacent to and spaced in the axial direction of said winding axis from said cable guide surface with said surface part extending transversely of the axial direction of and circumferentially relative to said winding axis and said surface part projecting radially inwardly toward said radially outwardly facing annular surface from said radially inwardly facing surface extending between said surface part and the larger diameter end of said radially inwardly facing surface.

2. Drive unit, as set forth in claim 1, wherein said surface part is bevelled in the direction of the smaller diameter end of said radially inwardly facing surface.

3. Drive unit, as set forth in claims 1 or 2, wherein said surface part comprises a step extending circumferentially in said radially inwardly facing surface with the radially extending surface of said step facing toward the larger diameter end of said radially inwardly facing surface.

4. Drive unit, as set forth in claim 3, wherein the radial dimension of the step surface of said step relative to the winding axis is in the range of 0.1 to 0.3 times the diameter of said transport cable.

5. Drive unit, as set forth in claim 4, wherein the radial dimension of the step surface of said step is in the range of 0.15 to 0.2 times the diameter of said transport cable.

6. Drive unit, as set forth in claim 5, wherein the radial dimension of the step surface of said step is 0,175 times the diameter of said transport cable.

7. Drive unit, as set forth in claim 4, wherein the radial dimension of the step surface of said step is in the range of 0.4 to 1 mm.

8. Drive unit, as set forth in claim 4, wherein the radial dimension of the step surface of said step is in the range of 0.6 to 0.8 mm.

9. Drive unit, as set forth in claim 4, wherein the radial dimension of the step surface of said step is approximately 0.7 mm.

10. Drive unit, as set forth in claims 1 or 2, wherein the axial dimension relative to the winding axis between said surface part and the larger diameter end of said radially inwardly facing surface is in the range of 1 to 4 times the diameter of said transport cable.

11. Drive unit, as set forth in claims 1 or 2, wherein the axial dimension relative to the winding axis between said surface part and the larger diameter end of said radially inwardly facing surface is in the range of 1.5 to 3 times the diameter of said transport cable.

12. Drive unit, as set forth in claims 1 or 2, wherein the axial dimension relative to the winding axis between said surface part and the larger diameter end of said radially inwardly facing surface is approximately 1.75 times the diameter of said transport cable.

13. Drive unit, as set forth in claim 4, wherein said radially inwardly facing surface comprises a frusto-conical surface extending from the smaller diameter end of said radially inwardly facing surface to said surface part and said radially inwardly facing surface is cylindrically shaped from said surface part to the larger diameter end of said radially inwardly facing surface.

14. Drive unit, as set forth in claim 1, wherein said radially outwardly facing annular surface is frusto-conically shaped with the smaller diameter end being positioned at the location of the attachment of said transport cable to said take-up roll.

* * * * *